United States Patent [19]

England

[11] Patent Number: 5,057,832

[45] Date of Patent: Oct. 15, 1991

[54] AUDIBLE GLIDE SPEED INDICATOR APPARATUS

[76] Inventor: Samuel G. England, Box 112, R.R. 1, Clearfield, Iowa 50840

[21] Appl. No.: 682,339

[22] Filed: Apr. 9, 1991

[51] Int. Cl.[5] .......................... G08B 23/00; G01P 5/00

[52] U.S. Cl. .......................................... 340/966; 73/180; 116/62.3

[58] Field of Search ...................... 116/62.3, 62.4, 112; 340/966; 73/180

[56] References Cited

U.S. PATENT DOCUMENTS

| | | | |
|---|---|---|---|
| 2,110,730 | 3/1938 | Holland, Jr. | 340/966 X |
| 2,454,587 | 11/1948 | Arnold | 340/966 |
| 2,519,015 | 8/1950 | Bensen | 340/966 |
| 4,215,646 | 8/1980 | Williams | 116/137 R |
| 4,903,630 | 2/1990 | Rezmer | 116/62.3 X |
| 4,908,619 | 3/1990 | Bala et al. | 340/966 |

*Primary Examiner*—Daniel M. Yasich
*Attorney, Agent, or Firm*—Leon Gilden

[57] ABSTRACT

An audible indicator is arranged in combination with an electronic stall indicator, wherein the audible device includes a conical entrance and exit tube coaxially aligned with a central cylindrical tube, with a whistle member positioned within the tube, with the whistle member defined by an elongate body oriented parallel to the axis of the exit, entrance, and central tube structure to provide audible indication in a range of ten to fifteen knots in advance of stall indication by the electronic stall indicator device.

1 Claim, 4 Drawing Sheets

AUDIBLE GLIDE SPEED INDICATOR APPARATUS

BACKGROUND OF THE INVENTION

1. Field of the Invention

The field of invention relates to stall warning devices, and more particularly pertains to a new and improved audible glide speed indicator apparatus wherein the same is arranged for providing an audible signal in concert with an electronic stall indicator organization.

2. Description of the Prior Art

Various indicators of electronic construction are utilized in the prior art to provide stall speeds at predetermined velocities and angular orientations of an airplane.

An example of a prior art stall warning system for use in an aircraft is set forth in U.S. Pat. No. 3,518,621 to Collett wherein flap and air vane controlled syncros are a signal response to various lift of an organization utilizing electronic organizations to effect such correlation.

U.S. Pat. No. 4,060,979 to Elsaesser, et al. is a stall indicator device for use with gas turbine engines to monitor turbine temperature and compressor speed.

U.S. Pat. No. 3,839,699 to Heinsohn, et al. sets forth an aircraft stall warning device based on rate of angular orientation of the aircraft relative to a reference level.

U.S. Pat. No. 3,630,169 to Corey sets forth a stall warning indicator mounted on a leading edge of an aircraft wing utilizing transmitter tubes transmitting air flow from the wing structure of the aircraft.

U.S. Pat. No. 4,908,619 to Bala sets forth a further example of an aircraft stall warning system where the signal produces a function of flap and aircraft thrust.

As such, it may be appreciated that there continues to be a need for a new and improved audible glide speed indicator apparatus as set forth by the instant invention which addresses both the problems of ease of use as well as effectiveness in construction in providing an audible signal as a backup system in cooperation with an existing electronic indicator system and in this respect, the present invention substantially fulfills this need.

SUMMARY OF THE INVENTION

In view of the foregoing disadvantages inherent in the known types of aircraft stall speed indicator apparatus now present in the prior art, the present invention provides an audible glide speed indicator apparatus wherein the same utilizes a whistle member for effecting audible signaling of stall speed in advance of an electronic indicator organization. As such, the general purpose of the present invention, which will be described subsequently in greater detail, is to provide a new and improved audible glide speed indicator apparatus which has all the advantages of the prior art aircraft speed indicator apparatus and none of the disadvantages.

To attain this, the present invention provides an audible indicator arranged in combination with an electronic stall indicator, wherein the audible device includes a conical entrance and exit tube coaxially aligned with a central cylindrical tube, with a whistle member positioned within the tube, with the whistle member defined by an elongate body oriented parallel to the axis of the exit, entrance, and central tube structure to provide audible indication in a range of ten to fifteen knots in advance of stall indication by the electronic stall indicator device.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved audible glide speed indicator apparatus which has all the advantages of the prior art aircraft speed indicator apparatus and none of the disadvantages.

It is another object of the present invention to provide a new and improved audible glide speed indicator apparatus which may be easily and efficiently manufactured and marketed.

It is a further object of the present invention to provide a new and improved audible glide speed indicator apparatus which is of a durable and reliable construction.

An even further object of the present invention is to provide a new and improved audible glide speed indicator apparatus which is susceptible of a low cost of manufacture with regard to both materials and labor, and which accordingly is then susceptible of low prices of sale to the consuming public, thereby making such audible glide speed indicator apparatus economically available to the buying public.

Still yet another object of the present invention is to provide a new and improved audible glide speed indicator apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
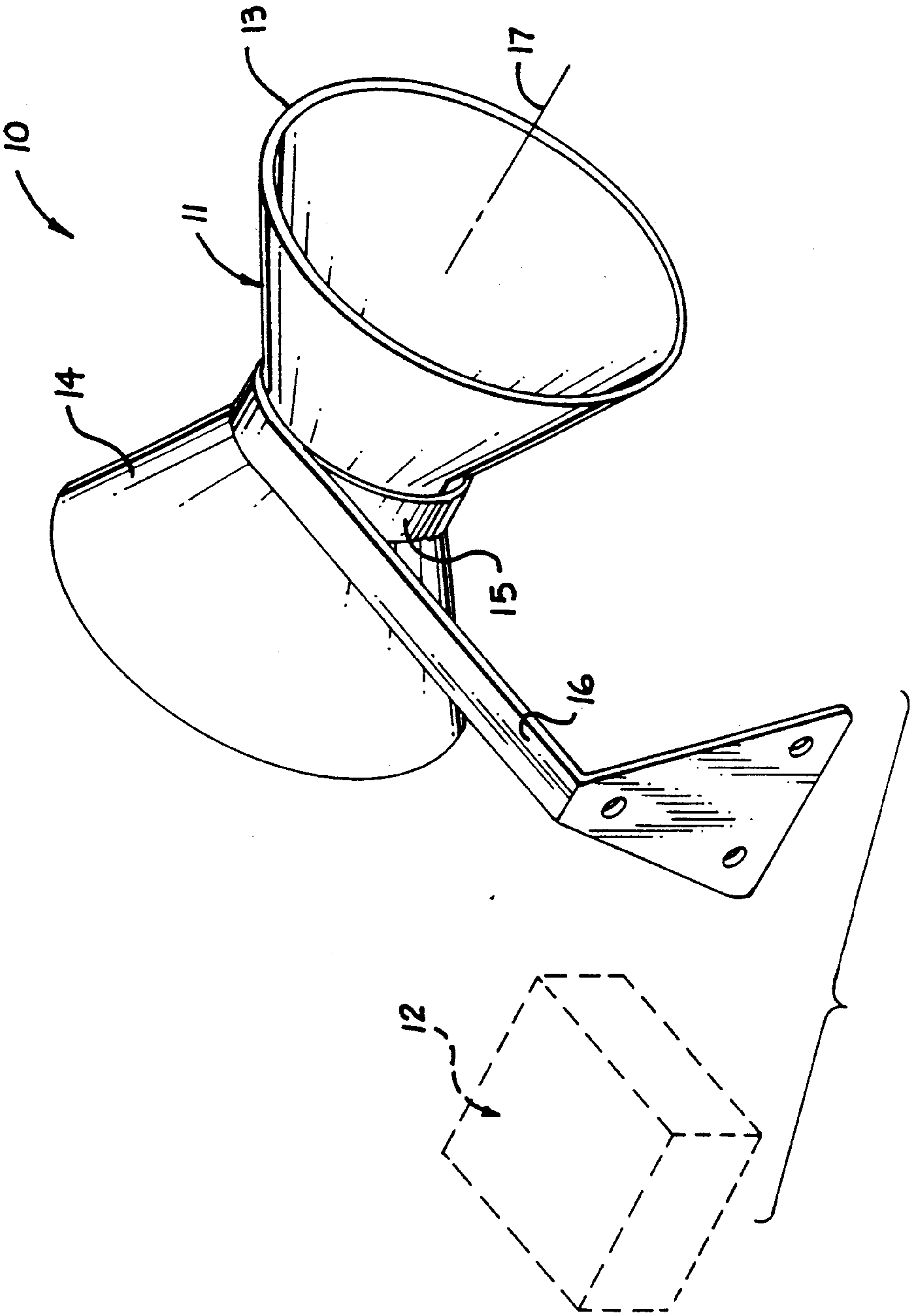
FIG. 1 is an isometric illustration of the instant invention.
Figure 2:
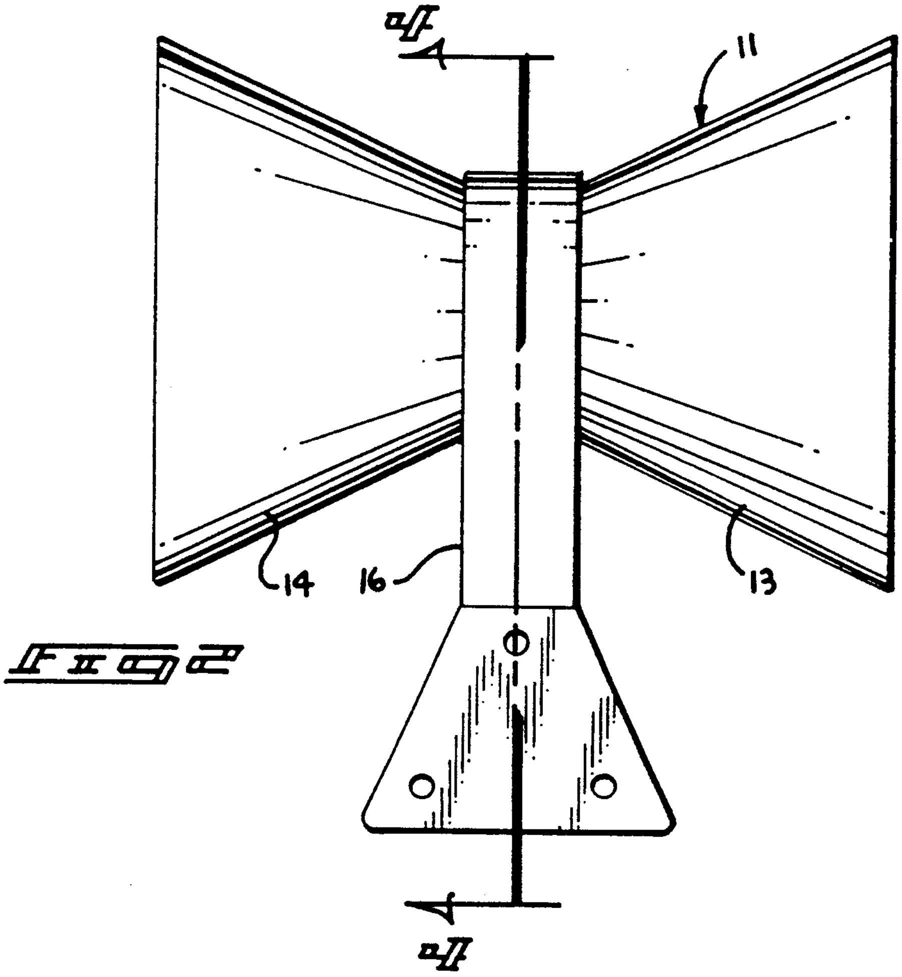
FIG. 2 is an orthographic side view of the instant invention.
Figure 3:
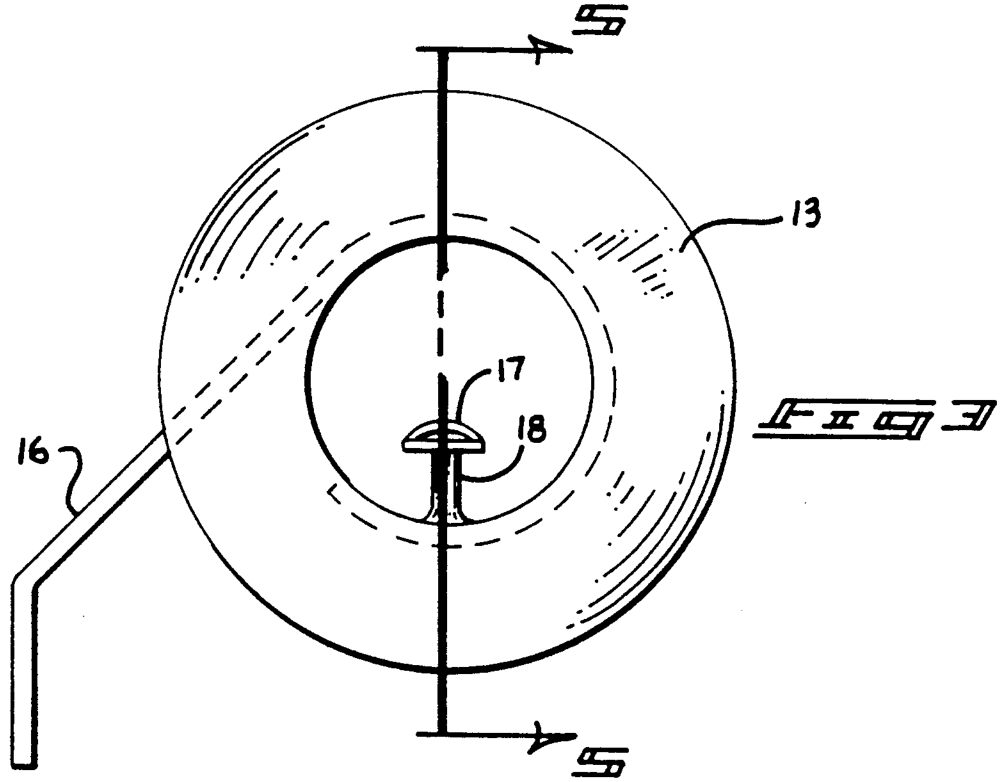
FIG. 3 is an orthographic frontal view of the instant invention, taken in elevation.
Figure 4:
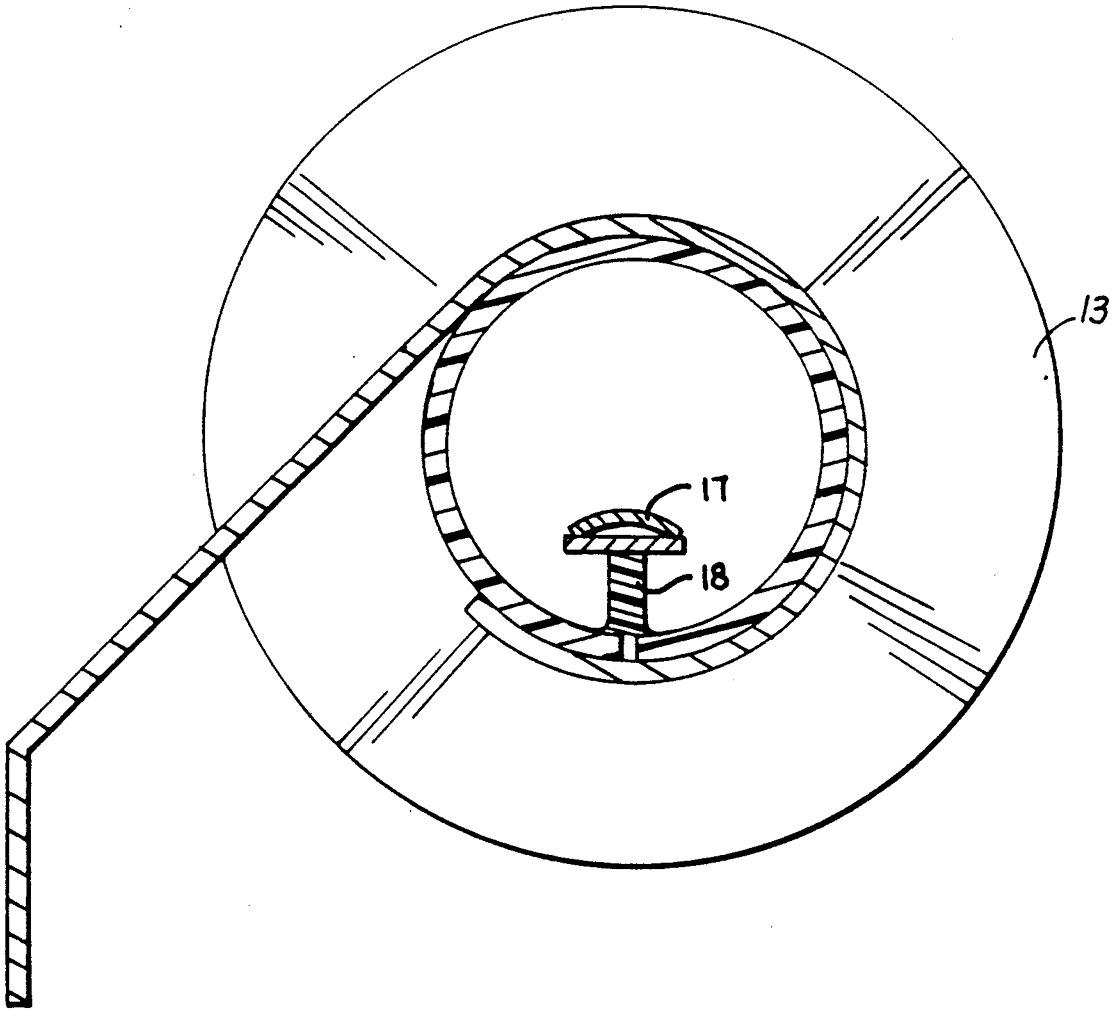
FIG. 4 is an orthographic view, taken along the lines 4—4 of FIG. 2 in the direction indicated by the arrows.
Figure 5:
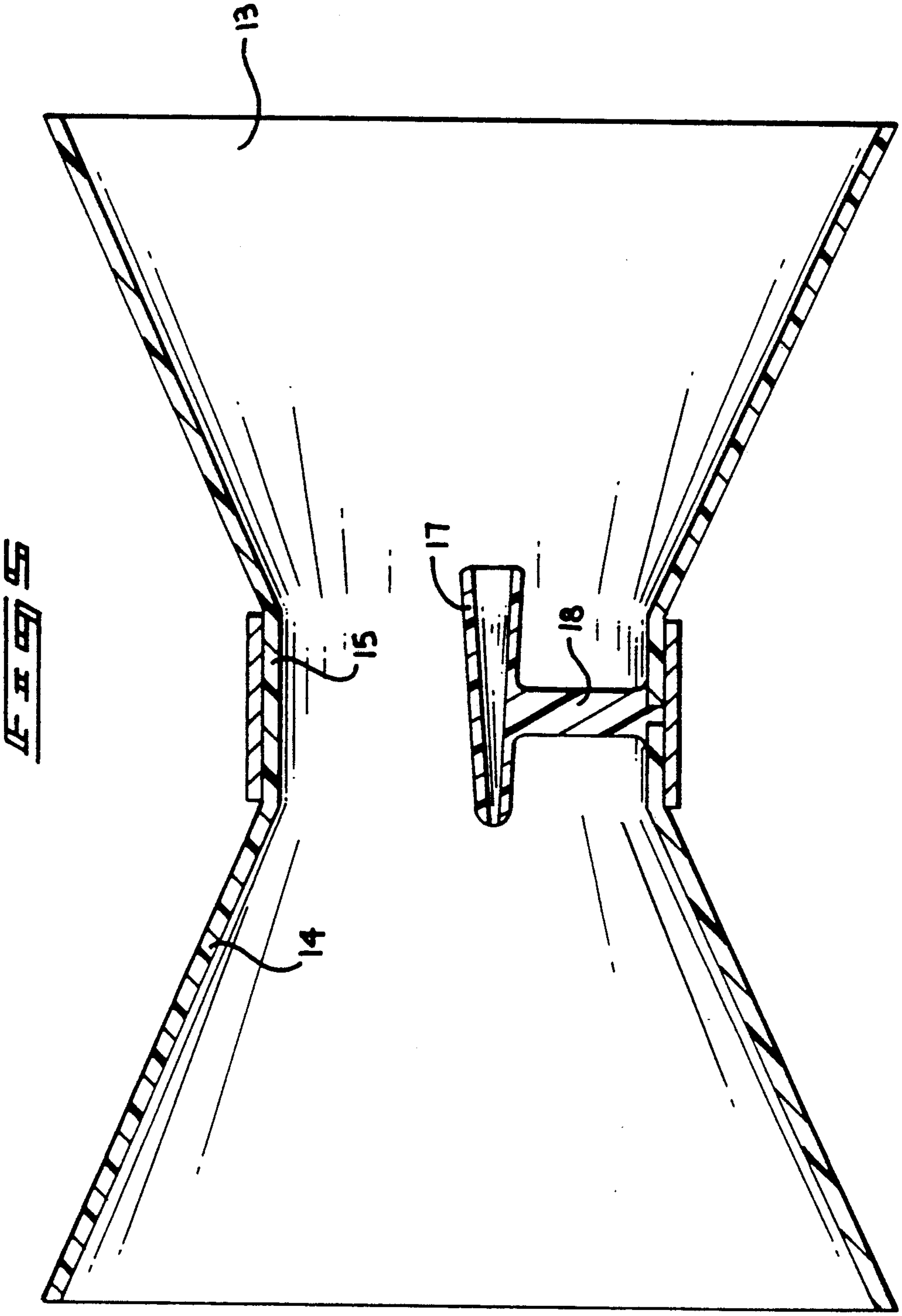
FIG. 5 is an orthographic view, taken along the lines 5—5 of FIG. 3 in the direction indicated by the arrows.

With reference now to the drawings, and in particular to FIGS. 1 to 5 thereof, a new and improved audible glide speed indicator apparatus embodying the principles and concepts of the present invention and generally designated by the reference numeral 10 will be described.

Typically, aircraft apparatus of various types utilize electronic stall equipment for indicating stall speed of an associated aircraft. Such equipment is typically utilized, but as all such equipment is subject to failure, the instant invention includes in cooperation with a conventional electronic stall speed indicator 12, as typified in U.S. Pat. No. 4,908,619 incorporated herein by reference, an audible device 11 in cooperation therewith utilizing an absence of moving parts to provide a backup system in combination with a conventional electronic stall indicator 12, as illustrated.

The audible device 11 includes an outwardly flared conical entrance tube 13 coaxially aligned with a conical exit and outwardly exit tube 14 and a central cylindrical tube 15, wherein each of the tubes are coaxially aligned relative to one another and formed of a semi-rigid polymeric material to dampen vibration. A mounting flange 16 is orthogonally mounted to the cylindrical central tube 15 orthogonally oriented relative to an axis 17 defined by the entrance, exit, and central tube 13, 14, and 15 respectively. A support leg 18 orthogonally mounted to an interior surface of the cylindrical central tube 15 is orthogonally oriented relative to the axis 17 and includes an elongate whistle body whose longitudinal whistle axis is arranged parallel to the axis 17.

In this manner, the audible device is arranged to provide audible signaling at approximately sixty-five to seventy-five knots of air speed typically and of typical ten to fifteen knots in advance of stall indicator speed indicated by the electronic stall speed indicator device 12.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. An audible glide speed indicator apparatus, comprising in combination, a first electronic stall speed indicator device arranged to effect electronic signaling of stall speed at approximately sixty-five to seventy-five knots of air speed, a second, backup, stall speed device, the second device being an audible device spaced from the electronic stall speed indicator device and arranged to effect audible signaling of stall speed in a range defined between fifty to sixty-five knots of air speed, said audible device includes a conical outwardly flared entrance tube coaxially aligned and mounted to a forward terminal end of a cylindrical central tube, and a conical rearwardly flared exit tube fixedly mounted to a rear terminal end of the cylindrical central tube, wherein the conical entrance tube, the conical exit tube, and the cylindrical central tube are coaxially aligned relative to one another along a central axis, and a mounting flange integrally mounted to the cylindrical tube orthogonally oriented relative to the central axis, and the conical entrance tube, the conical exit tube, and the cylindrical central tube are formed of a semi-rigid polymeric material to dampen vibration, and the cylindrical central tube includes a cylindrical interior surface, and the cylindrical interior surface includes a support leg fixedly mounted to the interior surface orthogonally oriented relative to the central axis, and an elongated whistle member orthogonally mounted to an upper terminal end of the support leg, wherein the whistle member is arranged parallel relative to the central axis.

* * * * *